T. W. PEET.
TIRE.
APPLICATION FILED MAY 8, 1909.
984,597.
Patented Feb. 21, 1911.
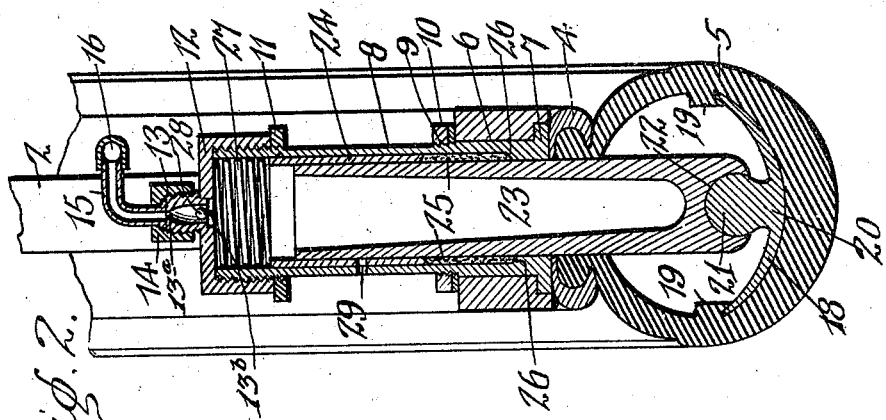
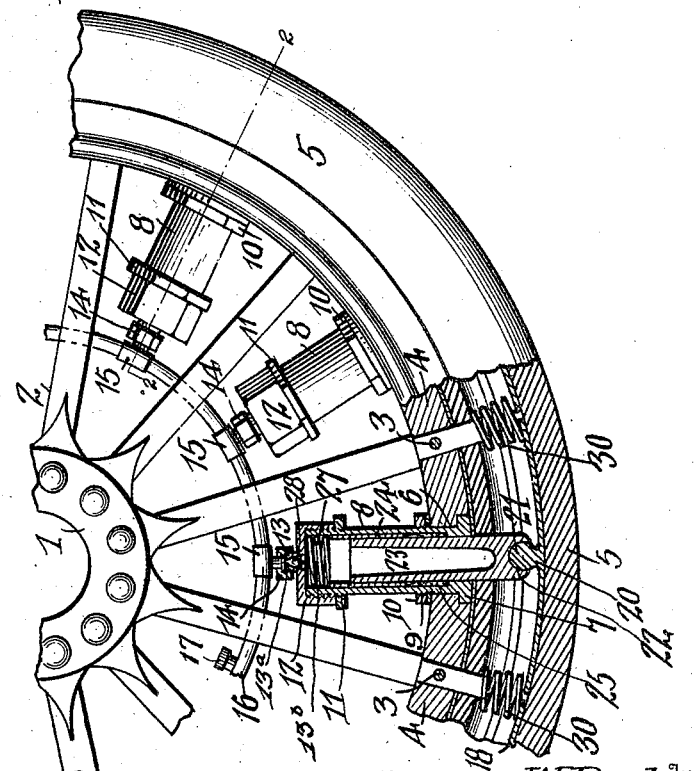
Thomas W. Peet, Inventor

UNITED STATES PATENT OFFICE.

THOMAS WILLIAM PEET, OF NEW BRITAIN, CONNECTICUT, ASSIGNOR OF ONE-HALF TO ADNA FREDERICK JOHNSON, OF NEW BRITAIN, CONNECTICUT.

TIRE.

984,597.

Specification of Letters Patent.   Patented Feb. 21, 1911.

Application filed May 8, 1909.   Serial No. 494,748.

*To all whom it may concern:*

Be it known that I, THOMAS W. PEET, a citizen of the United States, residing at New Britain, in the county of Hartford and State of Connecticut, have invented certain new and useful Improvements in Tires, of which the following is a specification, reference being had therein to the accompanying drawing.

This invention relates to cushioning devices for vehicle wheels, and the principal object of the same is to provide the rim of the wheel with a plurality of cushion cylinders in which plungers are mounted, said plungers being actuated by the contraction and expansion of the tire of the wheel.

In carrying out the object of the invention generally stated above it is contemplated equipping the wheels with a plurality of cylinders which are in communication with a source of air supply, the tire for said rim being preferably a flexible one and having a universal connection with plungers which operate in the said cylinders against the air pressure therein, the arrangement being such that when a portion of the tire is contracted, the plunger or plungers carried thereby will be forced into their cylinders and compress the air therein.

It will be understood, of course, that the essential features necessarily involved in carrying out the objects of the invention stated above are susceptible of changes in details and structural arrangements, one preferred and practical embodiment of which is shown in the accompanying drawings wherein—

Figure 1 is a fragmentary front elevation of a vehicle wheel, parts thereof being shown in section to illustrate the application of the present invention thereto. Fig. 2 is a central vertical sectional view taken on the line 2—2, thereof.

Referring to said accompanying drawings by numerals, 1 designates the hub of a vehicle from which the spokes 2 radiate and which have the usual tenon and pin connection 3 with a rim 4, said rim being preferably of the clencher type, for the usual side flange engagement with the base of the tire 5.

Between each spoke 2, the rim is provided with an opening 6 in which is seated a flanged end 7 of a cylinder 8, said cylinder being provided with a threaded portion 9 for engagement with a lock nut 10 which firmly holds the cylinder in the opening of the rim. The free end of the cylinder 8 is threaded for the reception of a nut or collar 11 which forms a seat for the flanges of a cap 12 having a threaded engagement over the free end of the cylinder. The central portion of said cap 12 is provided with an outstanding tubular projection or nipple 13 through which communication is had with the interior of the cylinder. Said nipple is threaded for the reception of a cap 14 which has a pipe connection 15 with a connecting pipe 16 extending entirely around the wheel and being provided with a nipple or nipples 17 by means of which the same may be connected with a source of compressed air, not shown, but which may be the usual tire inflating pump.

The tire 5 is provided with a plurality of plates 18 which are shaped to conform to the contour of the inner face of its tread portion, the longitudinal edges of the plates being in engagement with ledges 19 oppositely disposed on the inner sides of the tire and which may be formed integral therewith. Each plate is provided with a centrally located outstanding lug 20 having a spherical head 21 which is seated in a socket 22 formed in the end of a hollow piston or plunger 23 mounted for reciprocation in each cylinder 8. A gland 24 is interposed between said plunger and the cylinder, the lower end of said gland bearing upon suitable packing 25 carried by a flanged portion 26 of the cylinder, the upper end of said gland being in contact with a strong spiral spring 27 which is interposed between said end and the cap 12 and which is constantly forcing said gland onto the packing material.

The nipples 13 have small port communications 13$^a$ with the pipes 15. Said nipples form cages for the check valves 28 which are preferably balls, and the inner ends of said nipples are open and provided with central seats or rests 13$^b$ for said valves. The valves 28 are freely movable in the nipples and permit the air to pass from pipes 15, through the nipples, to the cylinders 8; but back pressure from said cylinders will obviously cause said valves to seal ports 13$^a$ to prevent air returning to pipes 15 and 16 from said cylinders.

In using the improved wheel, the cylinders thereof are supplied with sufficient compressed air to cause their plungers to hold the tire expanded. As portions of the tire's tread is contracted incidental to its use, the plunger carried by such portion will be forced into the cylinder against the air pressure therein, thereby affording the necessary resiliency.

It will be seen from the foregoing that the present invention provides all the cushioning function of the ordinary inflated tire, without the disagreeable features of the latter incident to punctures and the like. Another prominent feature of the invention is the use of the ball and socket connection between the plungers and the tire. It will be readily understood that by the use of such connection, a uniform outward pressure is exerted upon the plunger when the tire is compressed, irrespective of the position of the tire when in such compressed condition.

To prevent friction between the plungers and the cylinders incidental to the reciprocations of the former, an opening 29 may be formed through the cylinders to permit lubricating material to be used between the plungers and cylinders.

As an adjunct to the described cushioning means for the wheel, the tire may be provided with springs 30 preferably located at the meeting edges of the plates so as to relieve pressure between said meeting edges and the opposite portion of the tire upon which the strain exerted by the ends of the spokes is the greatest.

What I claim as my invention is:—

1. A vehicle wheel comprising a rim, cushion cylinders mounted therein, means for supplying compressed air in communication with each cylinder, a tire carried by said rim, plates carried by the interior of said tire, and a plunger mounted in each cylinder and having a universal connection with each plate therein.

2. A vehicle wheel comprising a rim, a tire therefor provided with oppositely disposed internal ledges, plates in said tire and having their longitudinal edges in contact with said ledges, a lug projecting from each plate and provided with a spherical head, cylinders carried by said rim, a plunger mounted in each cylinder and having a socketed end for engagement with the heads of said lugs, and means for maintaining the plunger outwardly extended.

In testimony whereof I hereunto affix my signature in presence of two witnesses.

THOMAS WILLIAM PEET.

Witnesses:
JOHN A. JOHNSON,
HAROLD K. WATROUS.